J. Amick,
Bagasse Furnace.
No. 4,044. Reissued June 28. 1870.
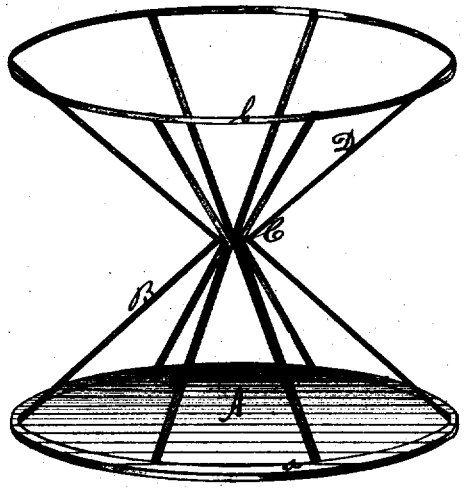
Witnesses.
H. N. Jenkins
Jno. F. Thompson
Inventor
John Amick
N. PETERS, PHOTO-LITHOGRAPHER, WASHINGTON, D. C.

United States Patent Office.

JOHN AMICK, OF ASCENSION PARISH, LOUISIANA.

*Letters Patent No.* 101,968, *dated April* 19, 1870; *reissue No.* 4,044, *dated June* 28, 1870.

SPIDER ARCH FOR BURNING BAGASSE.

The Schedule referred to in these Letters Patent and making part of the same.

I, JOHN AMICK, of the parish of Ascension, State of Louisiana, have invented a certain Improved Spider Arch for Burning Bagasse, of which the following is a specification.

My invention consists of a spider arch for burning bagasse in any kind of furnace or chimney, for it is equally applicable to every description of the one or the other. The objects subserved by my invention being a fuller and better ventilation, an improved draught in and through the furnace to which it is applied, and the provision of more space for the bagasse than is contained in any existing furnace-arch of any given width and length.

My invention will be at one understood by referring to the drawing, which shows it as it stands over the bottom of a furnace, the walls of the latter, however, not being shown, although they may be said to be represented by the rim of the bottom A at *a*, and the ring *b* at the top of the drawing.

In constructing my improved spider arch, I project, from the exterior walls of the furnace in which it is put, a number of arches, B, toward the center of the furnace, and at such an inclination that they will meet at C, three feet, or thereabout, above the bottom A, which I need hardly say consists of grates, and not of a surface in which there are no openings, as shown on the drawing.

The arches B may be of brick or of any other suitable material.

From the apex of the open dome-like structure, created by the arches B, I project a corresponding number of arches, D, toward the walls of the furnace, and at the same angle with arches B, but, as will be observed, in reverse direction to the latter, so that the upper pair presents the form of a skeleton inverted arch, as shown. I may or may not use this upper part in furnaces of a particular kind, but, as a general rule, its use is indispensable; so also I may or may not fill up the vertical space between the arches B and D with a thin vertical wall, according to circumstances. I mean by this, the spaces between each part B and part D that are in the same vertical line.

The upper open-work of the spider-like inverted dome or cone, which is produced by the radiating parts D when it is used, consitutes that part of my invention which receives the bagasse which is to be burned while the space below the arches B receives the fuel, wood, or coal, which is necessary to accomplish the active consumption of the bagasse.

To introduce the fuel, three or more doors communicate with this open space from the outside of the furnace. The bagasse is thrown into the upper section of the invention through a large drop that is placed a little above said section, between the boilers, or in any other appropriate place.

The furnace to which the structure shown on the drawing would be adapted would be circular, but, as I have before stated, very slight modifications would adapt it to any form of furnace.

I have tested my invention by actual practice, and found it superior to any arch for bagasse-furnaces I have ever seen.

What I claim, is—

The spider arch for burning bagasse, when composed of the parts B and D, as herein described, for the purpose set forth.

JOHN AMICK.

Witnesses:

C. W. WAILEY,

RUFUS R. RHODES.